United States Patent [19]
Waehner

[11] 3,784,737
[45] Jan. 8, 1974

[54] HYBRID DATA COMPRESSION

[75] Inventor: Glenn C. Waehner, Riverside, Conn.

[73] Assignee: United Aircraft Corporation, East Hartford, Conn.

[22] Filed: Jan. 12, 1973

[21] Appl. No.: 323,155

[52] U.S. Cl. .......... 178/6, 178/DIG. 3, 179/15.55 R, 325/38 B

[51] Int. Cl. ........ H04b 1/66, H04n 1/40, H04n 7/12

[58] Field of Search .................... 178/6, 6.8, DIG. 3; 179/15.55 R; 325/38 B

[56] References Cited

UNITED STATES PATENTS

| | | | |
|---|---|---|---|
| 3,403,226 | 9/1968 | Wintringham | 179/15.55 R |
| 3,492,431 | 1/1970 | Rees | 325/38 B |
| 3,715,483 | 2/1973 | Limb | 178/DIG. 3 |
| 3,729,678 | 4/1973 | Glasbergen | 178/DIG. 3 |

*Primary Examiner*—Howard W. Britton
*Attorney*—Melvin Pearson Williams

[57] ABSTRACT

A digital video data compression system compresses digital words as small as four-bits into two-bit words by means of a combination of coarse data compression and delta modulation data compression. In response to the two most significant bits being the same for five contiguous words, the apparatus switches into delta modulation mode in which the digital word representing the video brightness (sixteen shades of gray in the four-bit embodiment herein) is incremented or decremented by one level or left unchanged. In the encoder section, a delta modulation loop responds to the delta modulation commands to maintain a digital word of the same value which is created by the same command in the decoder section, and that value is compared with incoming words so as to cause the operation to shift into a coarse mode when the delta-modulated word varies from the incoming word by more than three levels, the two-bit compressed word representing, in the coarse mode, the two most significant bits of the video data word. When in the delta modulation mode, one of the four combinations representable by the two bits is a command to shift into the coarse mode; when in the coarse mode, a return to the delta mode is effected by sending the signal for pure black (ZERO, ZERO) followed by a signal for pure white (ONE, ONE), since this is a least-likely signal combination to occur. When this combination naturally occurs, it is automatically changed to a lesser shift by sending ZERO, ZERO followed by ONE, ZERO, in order to avoid ambiguity. Clocking, switching, comparing and other functions are disclosed.

7 Claims, 9 Drawing Figures

HYBRID DATA COMPRESSION

BACKGROUND OF THE INVENTION

1. Field of Invention

This invention relates to data compression, and more particularly to hybrid data compression employing a combination of coarse and delta modulation data compression.

2. Description of the Prior Art

A wide variety of data compression systems are known to the art. Usually, data compression is effective only in cases where a redundant digital code is employed, or where the data is redundant in nature by its very content. An example of the latter situation is in digital video, facsimile or other graphic systems wherein data bits relate to graphical presentations of some sort. Such systems may include weather map transceivers, picture phone, medical displays, navigational displays and digital sonar and radar presentation systems, including scan converters. One well known form of data compression system is a coarse/fine system wherein during periods in which the video intensity is changing very slowly, only fine changes are transmitted, and where it is changing rapidly, only coarse changes are transmitted. However, such systems are rather complex and require considerable hardware or significant utilization of a special purpose computer to be mechanized. On the other hand, a form of data compression known as delta modulation, which simply changes the video level by one gray level at a time from one picture resolution element to the next, have been utilized. However, because of the limited system slew rate, areas of high spatial frequency content (rapid changes in video level) are distorted.

In any data compression system, it is essential that the additional hardware required to compress the data must be much less bulky and costly than the hardware that it allows to be removed in order for the overall system cost and complexity to be reduced by means of data compression. Further, the data compression should not sacrifice necessary performance or video quality.

SUMMARY OF INVENTION

The primary object of the present invention is to provide improved digital data compression.

According to the present invention, data compression includes the use of coarse data compression in periods of high spatial frequency content of the digital data and uses delta modulation compression in periods of low spatial frequency content of the digital data. According further to the present invention, the more significant bits of several words of digital input data is examined simultaneous to determine when the incoming digital data has a low spatial frequency content (slowly changing levels), and operation is switched into a delta modualtion mode in response thereto; in the encoder, a word is updated by delta modulation and is compared to the incoming digital data word to determine when delta modulation has failed to keep pace with the incoming word, in response to which operation is shifted into a coarse data compression mode. In accordance still further with the present invention, a delta modulation form of data compression includes codes which indicate that the data word should be increased, decreased or left unchanged or that the operation should shift into the coarse mode, and when in the coarse mode, signal codes equivlaent to maximum darkness followed by maximum lightness are used to indicate that the operation should shift into the delta modulation mode. In accordance still further with the present invention, when in the coarse mode of operation, a valid input signal combination of maximum likeness following a signal combination indicating maximum darkness is altered to indicate the next lower coarse level of lightness so as to avoid ambiguity as between it and a signal code indicating a shift to the delta modulation mode of operation.

The present invention is readily implemented utilizing medium scale integrated circuitry which is widely available in the market place. The system in accordance herewith is valid for small data words, such as four bits compressed to two bits, and is advantageous in compressing data words as large as eight bits each. The invention, however, since it is only approximate in certain instances, is not useful for digital words representing numerical values or alpha numeric symbols, or in other cases where faithful accuracy is required. However, the invention does not detract from video signals, since in any case where the system does not faithfully reproduce the incoming digital video signal, it in fact does not degrade from that which is optically observable, and instead perhaps enhances the optical appearance of video displays generated from the demodulated compressed data in accordance herewith. Not only is the video display likely to be more pleasing utilizing data compression in accordance with the present invention, but it is in essence faithful (that is, to the extent that important or alarm situations are being displayed, none of such situations are masked or rendered less recognizable hereby).

Other objects, features and advantages of the present invention will become more apparent in the light of the following detailed description of a preferred embodiment thereof, as illustrated in the accompanying drawing.

DESCRIPTION OF THE PREFERRED EMBODIMENT

Figure 1:
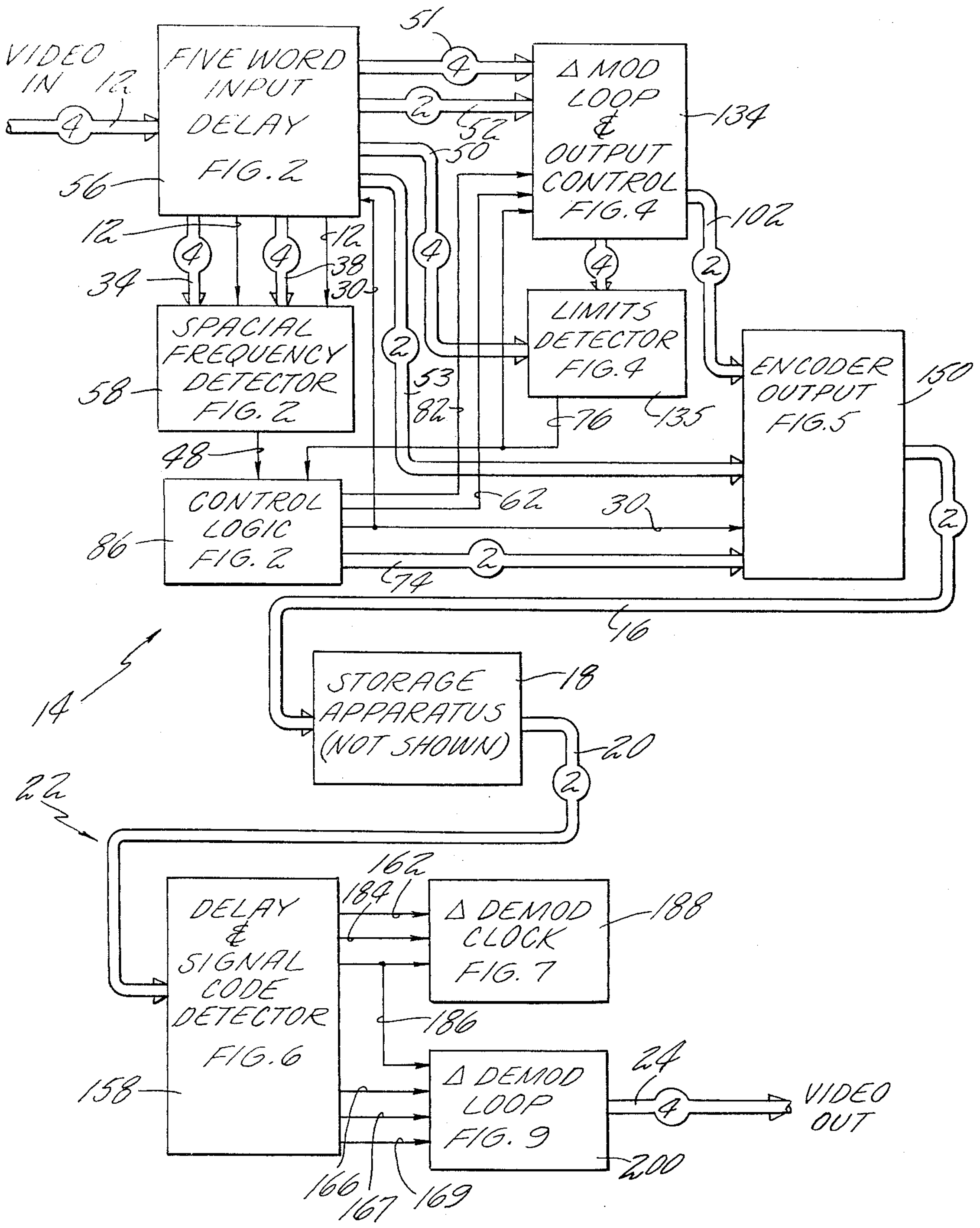
FIG. 1 is a simplified block diagram of a preferred embodiment of the present invention implemented in dedicated hardware.

Referring now to FIG. 1, a four-bit video input word is applied on a bus 12 to a data compression encoder 14 for compression to two bits on a bus 16 which may be applied to a storage apparatus 18 or other data channel or handling apparatus, from which it may be applied on a two-bit bus 20 to a data compression decoder 22 which supplies substantially restored four-bit video output data words on a bus 24. It should be noted that the mere reduction in electrical connection between the video input bus 12 and the video output bus 24 by means of two-bit busses 16, 20 is of absolutely no significance in the utilization of a data compression system in accordance with the present invention. What is significant is that an entire storage apparatus may have its storage capacity reduced by 50 percent as a result of utilization of a data compression system in accordance herewith. The various components illustrated in FIG. 1 are described with respect to FIGS. 2, 4–7 and 9, hereinafter.

Figure 2:
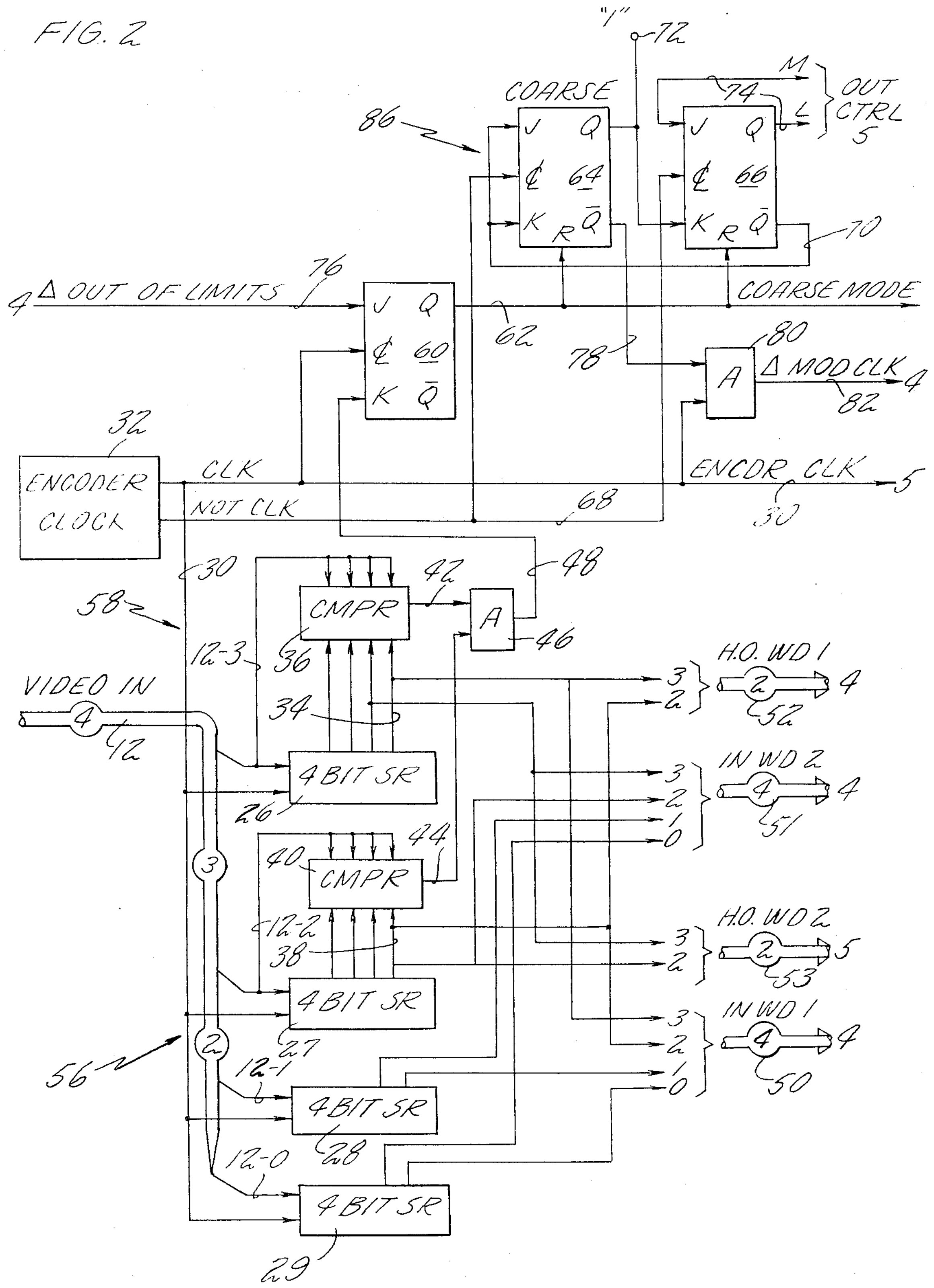
FIG. 2 is a schematic block diagram of input delay, spatial frequency detector, and control logic circuitry for use in the embodiment of FIG. 1.

Referring now to FIG. 2, the four-bit video input data word on the bus 12 is distributed to four four-bit shift registers 26–29 which respectively receive the most significant to least significant bits on the bus 12. Each of the shift registers 26–29 is advanced by an encoder clock signal which is provided to a line 30 by an encoder clock 32. The encoder clock 32 may, for example, operate at on the order of 2 MHz, and must be related to the rate at which video input data is applied to the bus 12. For each clock signal on the line 30, a new bit is entered into each of the shift registers, the remaining bits being advanced one position to the right as seen in FIG. 2. The four stages of the shift register 26 are connected by four related lines 34 to a four-bit compare circuit 36, the opposing four inputs of which comprise the most significant bit of the bus 12. Similarly, the four stages of the shift register 27 are connected by a plurality of lines 38 to a four-bit compare circuit 40, the other four inputs of which comprise the next to most significant bit of the bus 12. In this fashion, all four bits in the shift register and a bit about to enter the shift register must be identical in order for the compare circuits to issue output signals on related lines 42, 44 so as to operate an AND circuit 46, the output of which on a line 48 is indicative of the fact that the most significant bit and next most significant bit of five data words in a row are identical. The right most two stages are utilized to provide data words relating to a first word received and a second word received, and also the two highest ordered bits thereof on a corresponding plurality of data busses 50–53. The shift registers 26–29 comprise a five word input delay 56.

Figure 3:
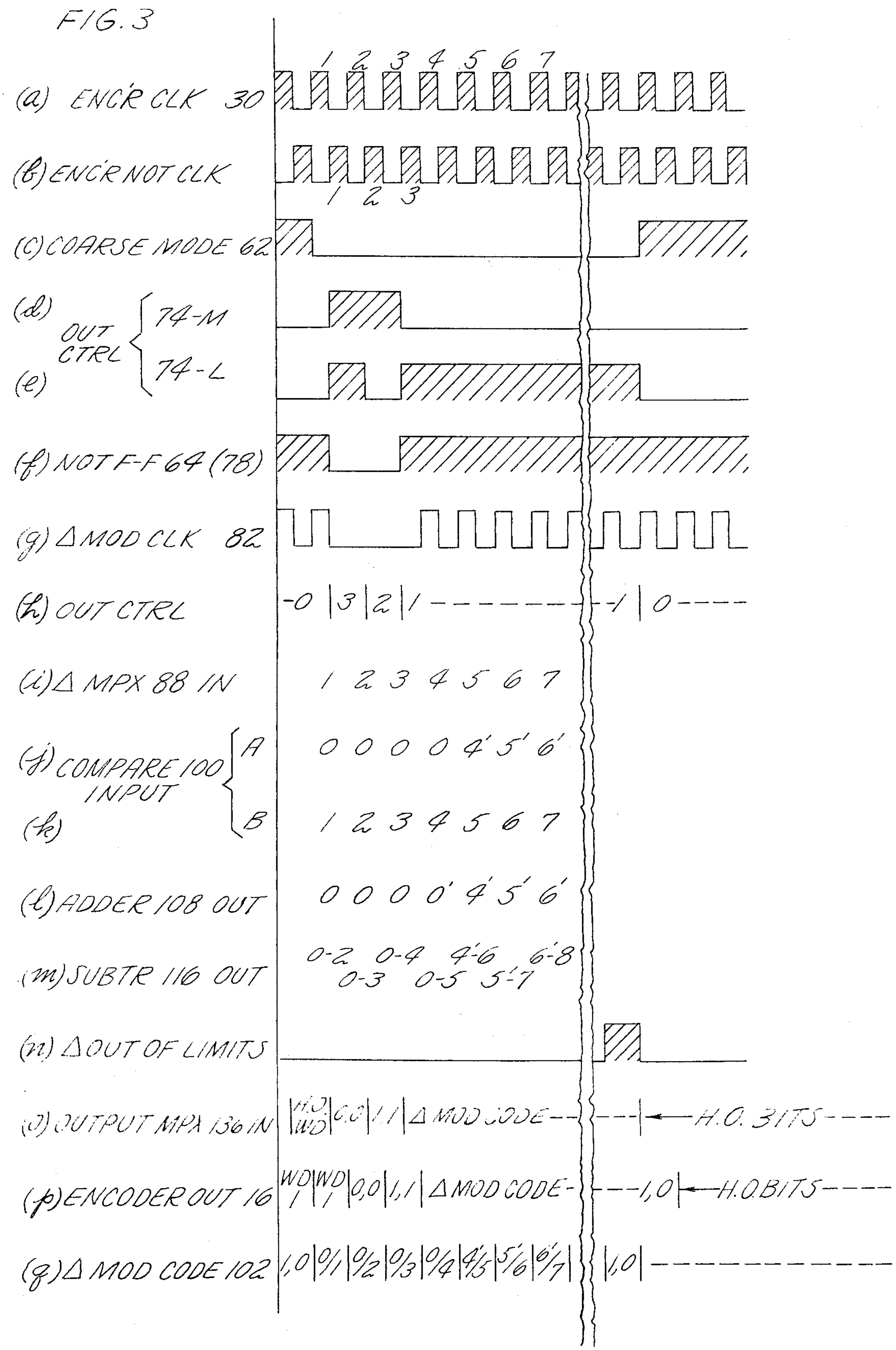
FIG. 3 is a timing diagram illustrating the operation of the apparatus of FIG. 2.

The compare circuits 36, 38 comprise a spatial frequency detector 58 (FIG. 1) which, by sensing the case where the two highest ordered bits of five words in a row are identical determines that there is a low spatial frequency of input video, and that therefore operation is to be in a delta modulation mode (wherein frequency compression comprises simply indicating an increase of one, a decrease of one or no change in the video). The signal on the line 48 that thus indicates that fact is applied to the K input of a JK flip flop 60 which, if initially in the set state and thus applying a signal on a line 62 connected to its Q output will, in response to the next clock signal on the line 30, transfer to the reset state thereby causing the signal on the line 60 to disappear. Referring to FIG. 3, when the signal on the line 62 disappears, a pair of JK flip flops 64, 66 are no longer forced into a reset state, so that each may respond to signals on a NOT clock line 68 from the encoder clock 62. Because the flip flop 66 is initially in its reset state, there is a signal from its $\overline{Q}$ output on a line 70 applied to both the J and K inputs of the flip flop 64 so that the next succeeding NOT clock signal on the line 68 will cause the flip flop 64 to toggle; since the flip flop 64 was initially in its reset state, it toggles into the set state. Similarly, the flip flop 66 having a potential equivalent to a logical ONE applied from a source 72 to its J input, the next succeeding NOT clock signal on the line 68 will cause the flip flop 66 to be placed into its set state. The setting of the flip flops 64, 66 is shown in illustrations (*d*) and (*e*) of FIG. 3. The rise of the second NOT clock pulse will however cause the flip flop 66 to toggle since the source 72 applies the signal J input and the now-set flip flop 64 provides a signal to the K input so that the flip flop 66 will toggle on the next NOT clock signal thereby causing it to reassume the reset state. The third NOT clock signal will again cause the flip flop 64 to toggle since the $\overline{Q}$ output on the line 70 is again present, and will again force the flip flop 66 into the set state since the source 72 continues to apply a signal to the J input thereof. All succeeding NOT clock signals tend to reinforce the setting of the flip flop 66 so it simply remains in the set state, and since it is set, there is no signal on the line 70 so that the flip flop 64 will not be affected by succeeding clock pulses. Thus the flip flops 64, 66 remain in the reset and set states respectively so as to supply ZERO and ONE output signals on respective output lines 74-M and 74-L, which signals are used in FIG. 5 to control the output of the encoder section as described more fully with respect to FIG. 5 hereinafter. This condition will continue so long as the delta modulation mode of operation is to continue; however, when the words begin the change too fast for the delta modulation loop of FIG. 4 to continue to keep up by simply implementing or decrementing by one level at a time, eventually the delta modulation loop falls out of limits (as described with respect to FIG. 4 hereinafter) so as to provide a delta out of limits signal, on a line 76, to the J input of the coarse flip flop 60, so that the next succeeding clock signal on the line 30 will cause the flip flop 60 to become set. The setting of the flip flop 60 applies the forced reset to the flip flops 64, 66 so they are immediately both held in the reset state. The forced reset is necessary to the flip flop 64 so that succeeding NOT clock signals cannot cause it to toggle as a result of the signal on the line 70. Thereafter, the flip flops 64, 66 will remain in the forced reset condition until the presence of a signal on a line 48, at which time the sequence can repeat and the delta modulation mode can be assumed as described hereinbefore.

The $\overline{Q}$ output of the flip flop 64 is applied over a signal line 78 to an AND circuit 80, which also responds to the clock signal on the line 30 to provide a delta modulator clock signal on a line 82. Thus, the delta modulation clock signal on the line 82 is interrupted only when the flip flop 64 is set as in illustration (*g*) of FIG. 3. It should be noted that the signals on the lines 74 from the flip flops 64, 66 are used to control the output of the encoder, so as to cause it to sequence from being in the coarse mode, through applying the pair of series words, ZERO, ZERO and ONE, ONE as a signal to the decoder that operation is switching from the coarse mode to the delta modulation mode, and thereafter remain in the delta modulation mode. This is shown in illustration (*h*) of FIG. 3 wherein the forced reset condition of the flip flops 64, 66 is equivalent to a decimal value of zero, both flip flops being set is equal to a decimal value of three, only flip flop 64 being set is equal to a decimal value of two, and flip flop 66 being set alone is equal to a decimal value of one. The utilization of these signals is described more fully with respect to FIG. 5 hereinafter. The encoder clock 32, the AND circuit 80, and the flip flops 60, 64 and 66 comprise control logic circuitry 86.

Figure 4:
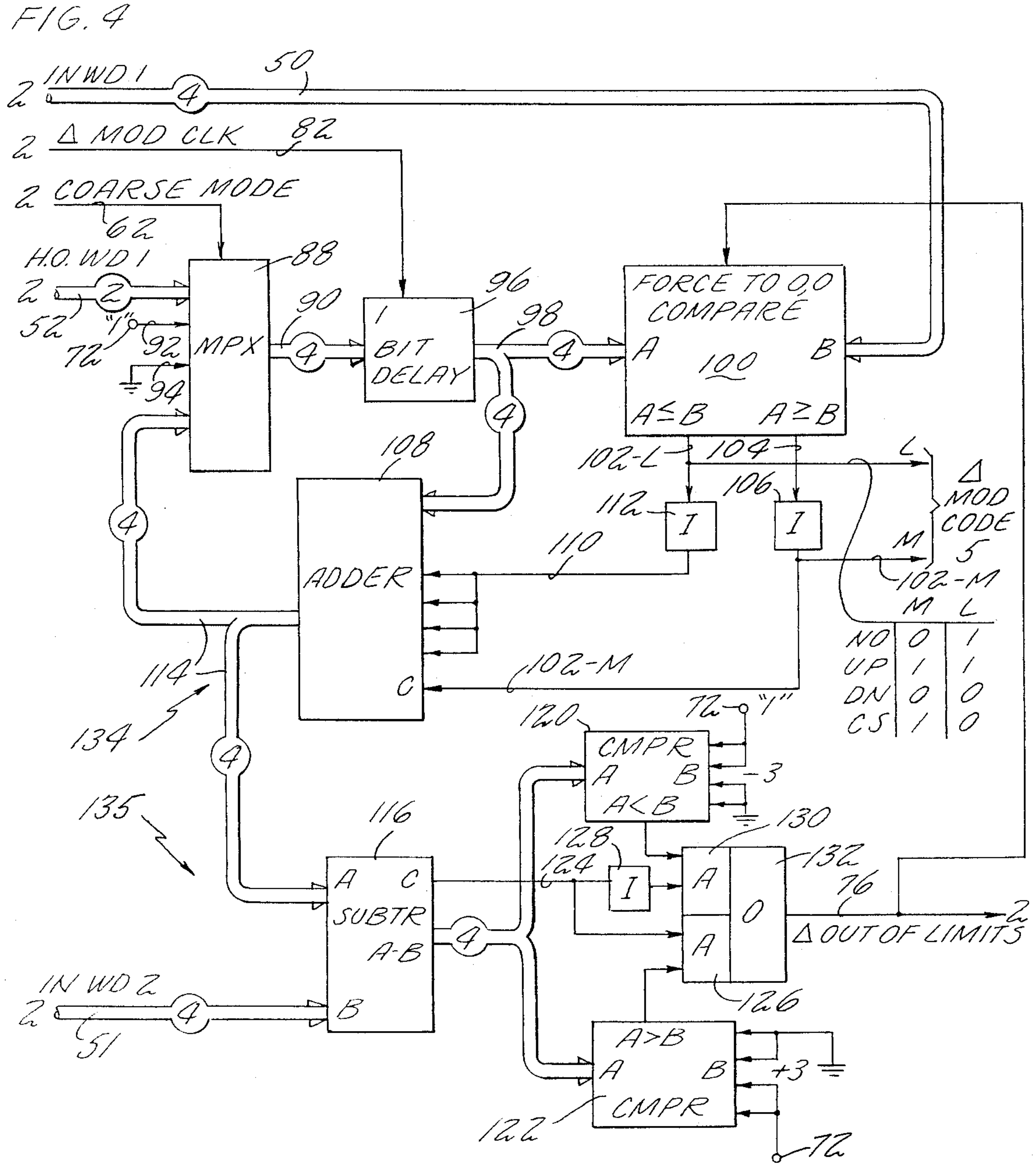
FIG. 4 is a schematic block diagram of delta modulation loop, output control and limits detecting circuitry for use in the embodiment of FIG. 1.

Referring now to FIG. 4, when the system switches to operation in the coarse mode, the coarse signal on the line 62 will cause a multiplexer 88 to have its four-bit output bus 90 connected to the bus 52 which contains the high order two bits of word one, an input 92 which has a potential equivalent to a logical ONE applied from the source 72 and a least significant input 94 which is connected to ground. The bus 92 connects to a one-bit delay circuit 96 which may preferably comprise four D-type flip flops, each respectively corresponding to one of the bits in the bus 90, each operative to provide at a four-bit output bus 98 the signal being fed thereto by the four-bit bus 90 at the moment that there is a rise in the delta modulation clock signal on the line 82. Since the four-bit shift registers 26, 27 and the coarse flip flop 60 (FIG. 2) are both operated in response to the encoder clock signal on the line 30, the one-bit delay circuit 96 will just miss receiving the first signals on the bus 90 that results from the multiplexer 88 switching to the coarse position; however, on the next clock pulse on the line 30, the AND circuit 80 (FIG. 2) generates the delta modulation clock signal on the line 82 so as to set the D-type flip flops in the one-bit delay 96 to represent the data received from the multiplexer 88. It should be noted that the data on the four-bit bus 90 comprises the two high order bits of word one (a word which has been delayed four clock periods) as well as a least significant bit of ZERO and a next to least significant bit of ONE. Thus the four-bit bus 90 has a value equivalent to decimal two higher than the value of a four-bit word utilizing the two high order bits of word one alone would have. The function of passing the high order bits of the two-bit bus 52 plus the decimal value of two (inputs 92, 94) through the multiplexer 88 to the one-bit delay 96 is to supply a base value (at the moment of resuming the delta modulation mode) for the delta modulation loop to add and subtract from, in order to maintain an updated data word (which the delta demodulator section described with respect to FIG. 9 hereinafter will duplicate) in order to continuously generate the delta modulation signals required for cumulatively maintaining a data word which is the same as, or closely following, the input data word when in the delta modulation mode. Notice that the one-bit delay 96 also provides the function of a delta modulation loop register for registering an initial value supplied by the multiplexer 88 when in the coarse mode, and for registering the output of the adder, in each subsequent cycle of the delta modulation loop, for comparison with input words.

While in the coarse mode, the delta out of limits signal on the line 76 is applied to a compare circuit 100 to force both of its outputs to ZERO. Therefore a signal on a line 102-L will be ZERO and a signal on a line 104 will be ZERO. The signal on the line 104 is passed through an inverter 106 so as to generate a ONE on a signal line 102-M. This generates a code (most significant, least significant) of ONE, ZERO which, as shown in the small chart appended to the right of FIG. 4, is a code signal indicating that operation is currently in the coarse mode. While in the coarse mode, the only realistic function being performed is generating this code signal. The signals on the four-bit bus 98 are also applied to an adder 108 which receives at the opposite four inputs a signal on a line 110 from an inverter 112, as well as a carry signal on the line 102-M. Since the adder 108 has applied thereto all ONEs plus a carry to be added to the bits on the four-bit bus 98, this is the equivalent of adding zero to whatever is applied to the adder 108 by the four-bit bus 98.

Assume now, however, that five words in a row are of the same value in the high order bits. This will cause (FIG. 2) the resetting of the flip flop 60 so that the coarse mode signal on the line 62 disappears. This happens at NOT clock time so that a word which was just prior to the first of the five words in the sequence having equal high order bits will have been passed through the one-bit delay 96 and available on the four-bit bus 98 at the A input to the compare circuit 100 for comparison with the current word one on the four-bit bus 50 which is applied to the B input of the compare circuit 100. This will cause one or the other of the outputs of the compare circuit 100 to provide signal on the lines 102-L and 104; both signals will not be present since it is impossible for the very first of the first five words in a row having high order bits equal to be equal to a word which preceeded this first word. The one of the signals on the lines 102-L and 104 which operates is dependent upon whether the next prior word was less than or greater than the first of the five in a row having equal high order bits on the four-bit bus 50. If the A input is less than the B input, then the inverter 112 provides all ZEROs on the line 110 so that the corresponding inputs to the adder 108 are all ZERO; the lack of a signal on the line 104 will cause a signal on the line 102-M which is equivalent to adding a ONE in the adder 108 to the word on the line 98. On the other hand, if the A input is greater than the B input, then there is no signal on the line 102-L so the inverter 112 will provide a solid row of inputs by means of the line 110, and the signal on the line 104 will cause the inverter 106 to present no signal on the line 102-M. This causes a subtraction of one in the adder 108 from the value of the word in the four-bit bus 98. In the general case, when the delta modulation loop is exactly the input word, and the input word does not change from one to the next, then the A input to the compare circuit 100 may be equal to the B input so that the signals appear on both of the lines 102-L and 104. This causes the signals on the line 110 and on the line 102-M to be zero so that there is no change in the adder 108. When in the delta modulation mode, the absence of the coarse mode signal on the line 62 will cause the multiplexer 88 to connect a four-bit bus 114 from the output of the adder 108 to the four-bit bus 90 so as to form a delta modulation loop wherein each current word on the four-bit bus 50 is compared with the prior result of the delta modulation loop which appears on the four-bit bus 98. Note that each result is not compared with the current word due to the one-bit delay 96; instead, the current word is compared with the next prior result in each case. Further, the bus 52 provides the two high order bits through the multiplexer 88, along with the wired-in decimal two, as a base word for the delta modulation.

The prior result from the adder 114 is also applied on the four-bit bus 114 to a subtractor 116 to have subtracted therefrom the value of word two as presented on the four-bit bus 51. The output of the subtractor 116 is applied on a four-bit bus 118 to the A inputs of a pair of comparators 120, 122 the other inputs of which are fixed so that, together, the comparators 120, 122 may indicate when the word on the four-bit bus 118 is more negative than minus three or more positive than plus three indicating that word two is more than three levels different from the output of the adder 108. The compare circuit 120 has decimal twelve applied to its B input since the two high order inputs are connected to the source 72 which provides a potential equivalent to a logical ONE, and the two low order inputs are grounded. The comparator 122 has its B input oppositely connected so as to represent a value of decimal three. The subtractor 116 is, as is well knwon in the art, a simple four-bit binary adder which includes provision for adding a "hot one," or low order carry-in, and provision for complementing the B input thereto. Addition is in the normal binary fashion. The adder includes a carry output which provides a signal on a line 124 whenever the addition being performed therein results in a carry. This is applied to an AND circuit 126 so as to enable monitoring the output of the compare circuit 122 when the carry is present, and to block the output of the compare circuit 122 when there is no carry. The signal on the line 124 is also applied through an inverter 128 so as to block an AND circuit 130 thereby blocking the output of the compare circuit whenever there is a carry signal, but allowing usage of the output of the compare circuit 120 whenever there is no carry. Each of the AND circuits 126, 130 operate an OR circuit 132 which generates the delta out of limits signal on the line 76.

The operation of the subtractor, the compare circuits, and the gates 126, 130 is illustrated in Table I.

TABLE I

| EXAMPLE | Decimal | Binary | Compare 122: is A−B>0011 | Compare 120: is A−B<1100 |
|---|---|---|---|---|
| A. | 10 | 1010 | NO | YES |
| | −7 | 1000 | (O.K.) | (Block) |
| | +3 | 1 | | |
| | | C 0011 | | |
| B. | 7 | 0111 | YES | NO |
| | −10 | 0101 | (Block) | (O.K.) |
| | −3 | 1 | | |
| | | 1101 | | |
| C. | 10 | 1010 | YES | NO |
| | −8 | 0001 | (Block) | (O.K.) |
| | 2 | 1 | | |
| | | 1100 | | |
| D. | 10 | 1010 | YES | YES |
| | −5 | 1010 | (O.K.) | (Block) |
| | +5 | 1 | | |
| | | C 0101 | | |
| E. | 8 | 1000 | YES | NO |
| | −10 | 0101 | (Block) | (O.K.) |
| | −2 | 1 | | |
| | | 1110 | | |
| F. | 5 | 0101 | YES | YES |
| | −10 | 0101 | (Block) | (O.K.) |
| | −5 | 1 | | |
| | | 1011 | | |

For instance, consider example B wherein 10 is subtracted from 7. the result is −3 which is binary 1101. The compare circuit 122 senses that this is larger than binary 0011 and generates an output signal which it applies to the AND circuit 126. But since there is no carry from the subtractor 116, the AND circuit 126 is blocked. At the same time the compare circuit 120 determines that the resultant 1101 is not less than 1100 so it generates no signal. Thus it is determined that −3 is not out of limits. In Table I it should be noted that the value being subtracted is shown in complemented form and the binary operation is pure addition including the carry-in or "hot one," the complementing of one input and utilizing of the hot one followed by simple binary addition (this being the same as binary subtraction).

Additional explanation of the delta modulation loop and limits detector of FIG. 4, as well as the entire encoder section, appears hereinafter. The multiplexer, one-bit delay, compare circuit 100 and adder 108 of FIG. 4 comprise a delta modulation loop and output control circuit 134, and the subtractor and comparators 120, 122 and related logic circuitry comprise a limits detector 135.

Figure 5:
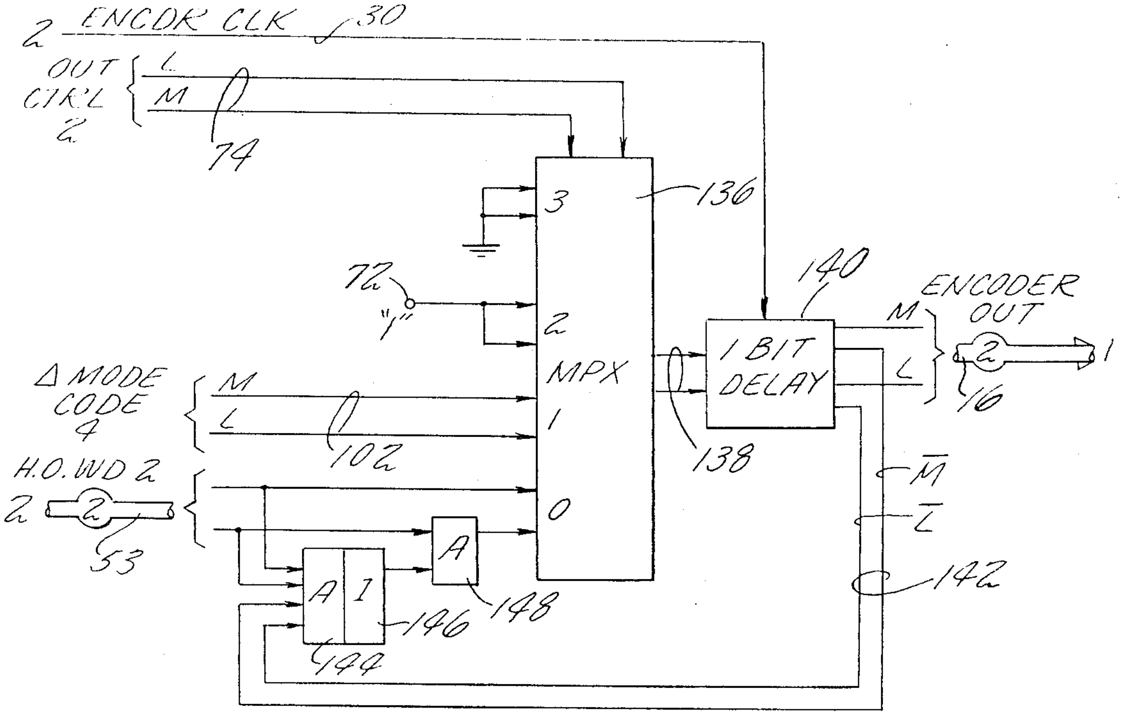
FIG. 5 is a schematic block diagram of an encoder output circuit for use in the embodiment of FIG. 1.

Referring now to FIG. 5, a multiplexer 136 (in a four pole, double throw configuration) can connect any pair of four pairs of inputs to its output in response to the combination of signals on the output control lines 74. The multiplexer 136 may be in integrated circuit form, such as Fairchild 3705. Similarly the other multiplexers illustrated herein may be differently-configured, similar circuits, which are well known and readily available in the market place. The output of the multiplexer 136 on a pair of lines 138 is applied to a one-bit delay circuit 140 which may simply comprise two D-type flip flops which respond to the encoder clock signal on the line 30 to become set in accordance with the bit combination of the lines 138 and provide a corresponding output to the two-bit encoder output bus 16. The inverted outputs of the D-type flip flops within the one-bit delay 140 are also provided on a pair of lines 142 to an AND circuit 144, the output of which is passed through an inverter 146 to an AND circuit 148. When operating in the coarse mode, the output control signals on the line 74 are both ZERO which causes the multiplexer to connect to the lower most pair of inputs designated by 0. So long as the AND circuit 148 is operative, the multiplexer will pass the two high order bits of word two from the two-bit bus 53 to the one-bit delay unit 140. The circuitry 144-148 is to sense a case where two video words in a row represent maximum darkness (ZERO, ZERO) followed by maximum brightness (ONE, ONE) and to block the second from most significant bit (bit two) of the two-bit bus 53 so as to alter the second word to a ONE, ZERO, thereby avoiding confusion with the signal code ZERO, ZERO – ONE, ONE which represents an instruction to change from coarse into delta modulation mode of operation. The purpose of the one-bit delay is to permit sensing a ZERO, ZERO of one word and a ONE, ONE of the next following word in the AND circuit 144. When the AND circuit 144 operates, the inverter 146 will provide no signal to the AND circuit 148, thus blocking it.

With reference to FIGS. 1–5, consider the transfer from the coarse mode into the delta modulation mode, in conjunction with FIG. 3. In FIG. 3 the word (or portion of a word) of data that may appear at various points starting with the first clock pulse after the coarse flip flop 60 (FIG. 2) is turned off are illustrated. Word ZERO is the last word which is not in a group of five words having the same high order bits. Word ONE is the first word of that group and word five is the fifth word to come along that causes the compare circuits 36, 40 to operate the AND circuit 46 and reset the coarse flip flop 60. Word ZERO in illustrations i through m of FIG. 3 is the word just preceeding word ONE (that is the last word which doesn't have high order bits like the five words in a row).

In illustrations (*i*) -(*m*) of FIG. 3, a prime denotes the output of the adder as modified by comparison with the word bearing that number. In other words, the output of the adder designated as 4' denotes the output of the adder when its input has been modified in accordance with the output of the compare circuit 100 from having been compared with word 4.

The circuitry of FIG. 5 comprises an encoder output circuit 150.

Referring again to FIG. 1, it should be understood that the output of the encoder section 14 is not applied directly to the decoder or demodulator section 22, but rather is applied to some utilization apparatus such as the storage 18 which has a sufficiently large word capacity so as to render it advantageous to utilize data compression in accordance with the present invention. In addition to the storage apparatus, certain complex communication channels and other devices having individual channels that are sufficiently expensive or otherwise pose problems of usage, may well take advantage of data compression of a small number of bits, to which the present invention is particularly directed.

Figure 6:
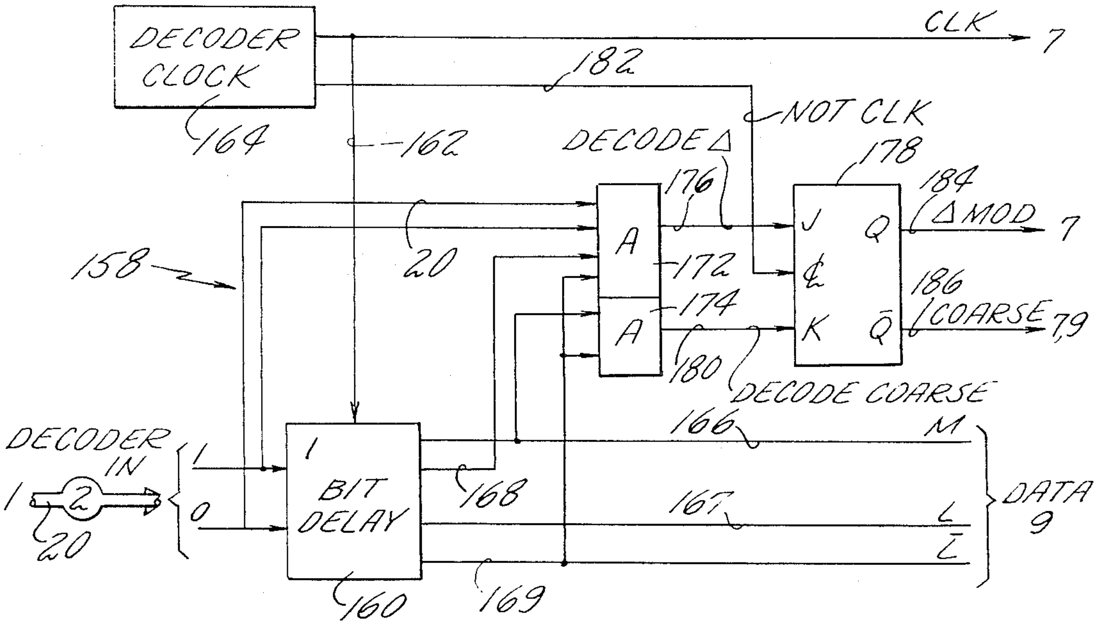
FIG. 6 is a schematic block diagram of delay and signal code detecting circuitry for use in the embodiment of FIG. 1.

Referring now to the delay and signal code detector 158 of FIG. 6, the decoder section receives two-bit input data words over the two-bit decoder input bus 20. These are applied to a one-bit delay circuit 160 which may comprise, for instance, a pair of D-type flip flops which are gated by a clock signal supplied on a line 162 from a decoder clock circuit 164. The decoder clock 164 need not be synchronized in any fashion with the encoder clock 32 (FIG. 2) but rather need only be related to the rate of receiving data words on the two-bit bus 20. For instance, the decoder clock may conveniently operate at on the order of 16 MHz. The output of the one-bit delay circuit 160 comprises both the true and complement of the most significant and least significant bits on a plurality of lines 166–169. The complement outputs on the lines 168, 169 and the decoder input word on the two-bit bus 20 are applied to an AND circuit 172 to sense the case where an input word of ZERO, ZERO is followed by an input word of ONE, ONE which comprises the signal code utilized when in the coarse mode to cause operation to be shifted into the delta modulation mode. The true output of the most significant bit on the line 166, and the complement output of the least significant bit on the line 169 are applied to an AND circuit 174 which decodes a ONE, ZERO signal code which is utilized when in the delta modulation mode of operation to signal a change to the coarse mode of operation. The AND circuit 172 supplies a decode delta signal on a line 176 to the J input of a JK flip flop 178, and the AND circuit 174 provides a decode coarse signal on a line 180 to the K input of the flip flop 178. Signals present on either of the lines 176, 180 will cause a flip flop 178 to assume the set or reset state, respectively, upon the appearance of the next NOT clock signal supplied by the decoder clock over a line 182. When in the set state, the flip flop 178 provides a delta modulation signal on a line 184, and when in the reset state it provides a coarse signal on a line 186. These signals, together with the clock signal on the line 162, are utilized in the delta demodulator clock circuit 188 of FIG. 7 to provide a gated, delta demodulator clock signal on a line 188.

Figure 7:
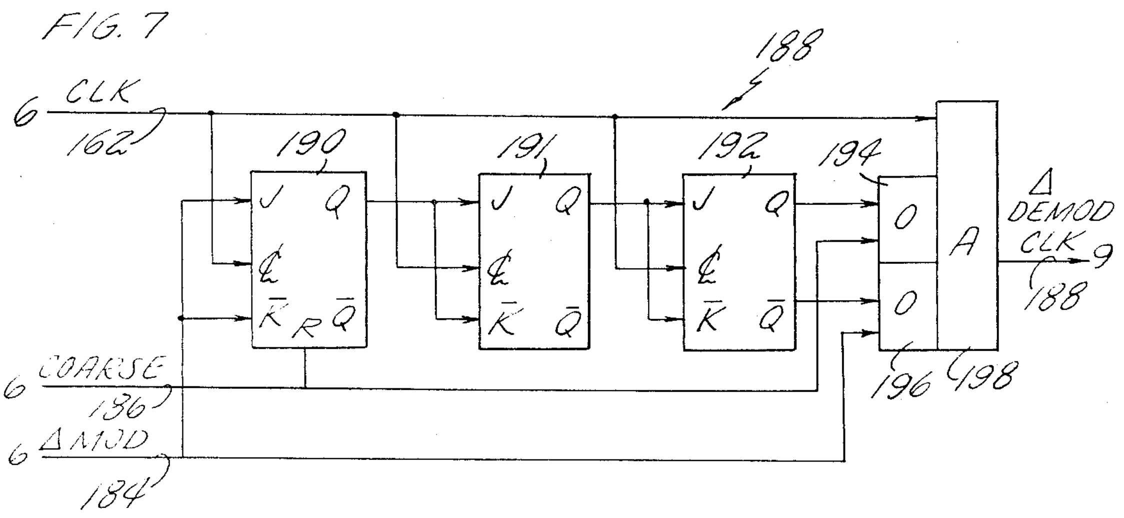
FIG. 7 is a schematic block diagram of a demodulator clock circuit for use in the embodiment of FIG. 1.
Figure 8:
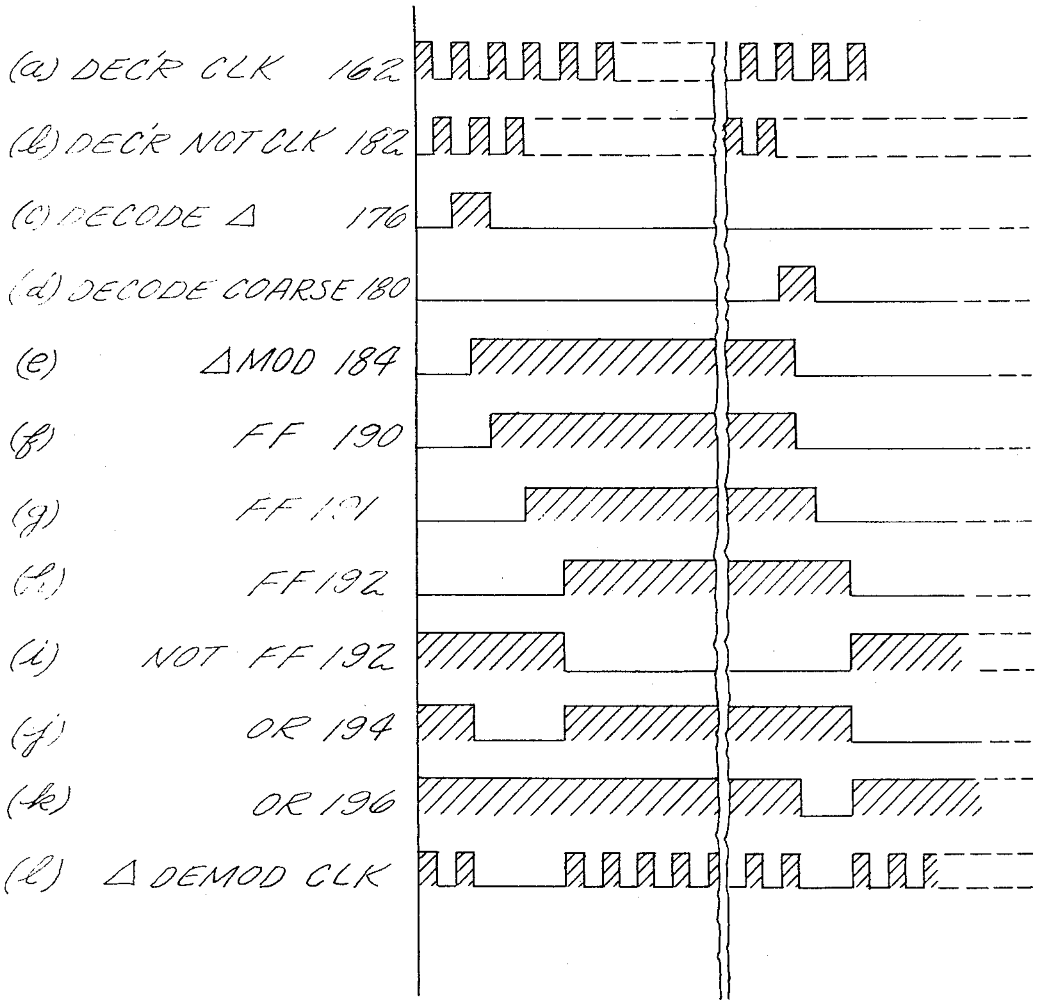
FIG. 8 is a timing diagram illustrating the operation of the demodulator clock circuitry of FIG. 7.

Referring to FIGS. 7 and 8, a plurality of JK flip flops 190-192 are connected to operate as D-type flip flops by having the J input connected to the $\overline{K}$ input so that with the signal applied to the common input a following clock signal will cause the flip flop to assume a set state, and with no signal applied to the common input, the following clock signal will cause the flip flop to assume the reset state. The inputs to the flip flop 190 are connected to the delta modulation signal on the line 184 so that once the flip flop 178 (FIG. 6) is set, the flip flop 190 will become set on the following clock signal. Note that this flip flop is previously forced to the reset state by the coarse signal on the line 186. When the flip flop 190 is in the set state, it applies inputs to the flip flop 191 so that on the following clock signal the flip flop 191 will become set; this in turn causes the flip flop 192 to become set on the next following clock signal. The set side of the flip flop 192 is connected to an OR circuit 194 and the reset side of the flip flop 192 is connected to an OR circuit 196. The OR circuit 194 is also connected to the coarse signal on the line 186 and the OR circuit 196 is responive to the delta modulation signal on the line 184. When the flip flop 192 is set, the OR circuit 194 will operate; Axiomatically, however, at that time the OR circuit 196 cannot be operated by the reset side of the flip flop 192 so it will operate only in response to a delta modulation signal on the line 184. Conversely, when the reset side of the flip flop 192 operates the OR circuit 196, the OR circuit 194 can operate only in response to the coarse signal on the line 186. The net effect is that the OR circuits 914, 196 will operate an AND circuit 198 during delta modulation mode of operation only when the flip flop 192 is set, and during the coarse mode of operation only when the flip flop 192 is reset. This is shown by comparison of illustrations (*d*), (*e*), (*h*), (*i*), and (*l*) of FIG. 8. The net effect (illustration (*l*) of FIG. 8) is that when switching from coarse into the delta modulation mode, the delta demodulator clock has a gap of two clock signals to permit the two word code of ZERO, ZERO followed by ONE, ONE to be recognized and responded to without causing that to appear as video data at the output of the device. Similarly, when switching from coarse mode into delta modulation mode, the delta demodulation clock has a one clock pulse gap in order to permit the unit to recognize the code of ONE, ZERO without causing it to become data, all as is described more fully with respect to FIG. 9.

Figure 9:
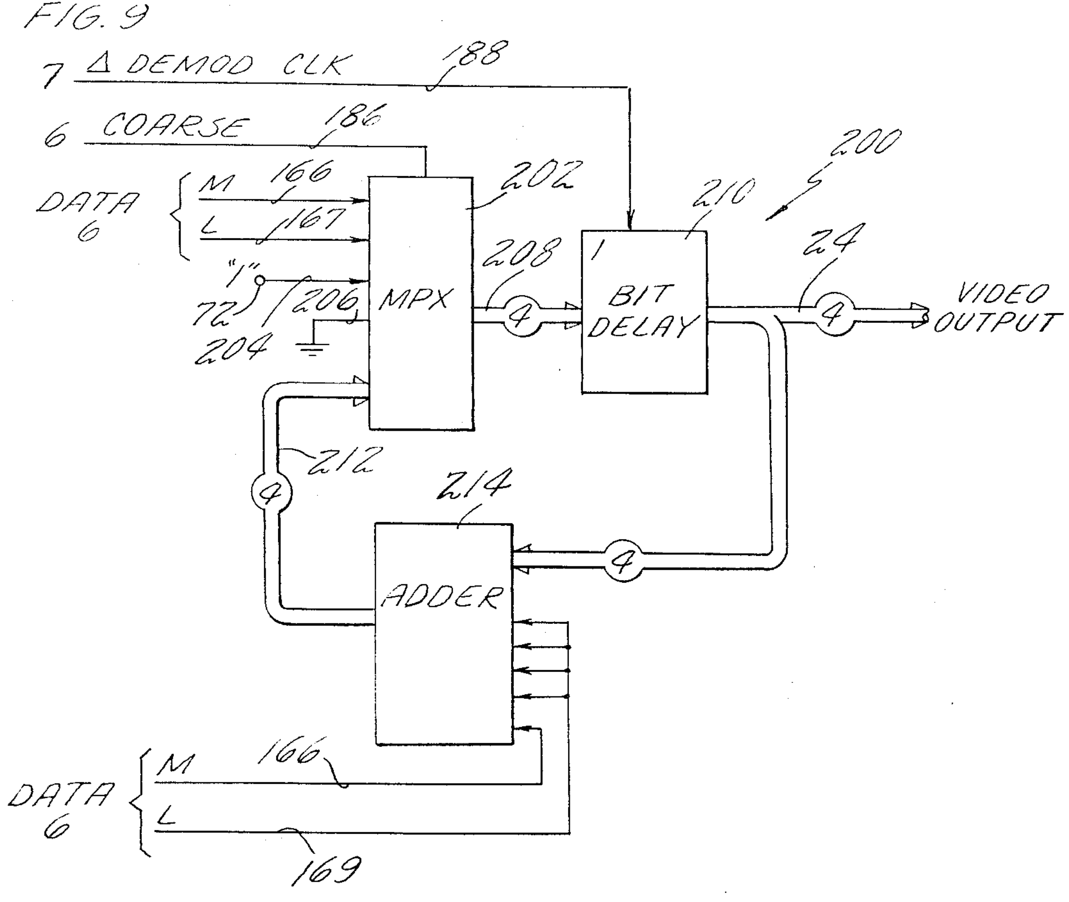
FIG. 9 is a schematic block diagram of demodulator loop output circuitry for use in the embodiment of FIG. 1.

FIG. 9 illustrates a delta demodulation loop circuit 200 which provides video output of the data compression system. A multiplexer 202 is operated in response to the coarse signal on the line 186 to cause data on the lines 166 and 167 as well as a forced one on a line 204 and ground on a line 206 to pass to the output of the multiplexer onto a four-bit bus 208 and to a one-bit delay circuit 210 which may comprise a pair of D-type flip flops that are clocked by the delta demodulator clock signal on the line 188. On the other hand, when in the delta modulation mode, the multiplexer 202 connects a four-bit bus 212 through the bus 208 to the one bit delay 210. The output of the one bit delay 210 is connected by the four-bit output bus 24 to an adder 214 that operates in the same fashion as the adder 108 as described hereinbefore with respect to FIG. 4. The other input to the adder comprises the complement of the least significant data bit on the line 169, together with a carry into the adder comprising the most significant data bit on the line 166. Thus, when in the coarse mode, the multiplexer 202 simply passes the most significant (M) and least significant (L) data bits on the lines 166, 167, together with a ZERO lowest-ordered bit (due to the grounded input 206) and a ONE in the next to lowest-ordered bit (as a result of the input 204 being connected to the source 72 which applies a potential equivalent to a logical ONE). When in the delta modulation mode, however, the delta modulation code is used to operate the adder so as to continuously update the count being passed from the adder through the multiplexer to the one-bit delay 210. When switching from coarse to delta modulation, the data on the lines 166 and 167 comprise code signals rather than video data, so that the one-bit delay circuit 210 is not clocked for two clock pulses so that this data is never actually lodged in the one-bit delay circuit 210. Similarly, when transferring from the delta modulation mode to the coarse mode, the one-bit delay circuit is not operated for one clock pulse so as to not respond to the signal code ONE, ZERO. Thus by the simple expedient of eliminating two clock pulses when switching into delta modulation and eliminating one clock pulse when switching into coarse operation, the code signals are removed from the train of video signals.

Referring again to the multiplexer 202, the inputs 204, 206 are connected so as to add decimal two to the value on the lines 166, 167 since this is statistically the average value of the true video signal. If, on the other hand, the ZERO, ZERO were used for low order bits, and this would always represent a negative error with respect to the actual video (except in the case where the actual video is ZERO, ZERO in the lowest ordered bits), or if ONE, ONE were used for the lowest ordered bits, this would always represent a positive error with respect to the video except in the case where the video were actually ONE, ONE. Thus, use of a ONE, ZERO combination is statistically more accurate than any other combination.

It should be noted that any delays which occur in the encoder section are isolated from and not concurrent with any delays which occur in the decoder or demodulation section.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent is:

1. A data compression system alternatively operable in a coarse mode, in which only a high order fraction of a digital data word is transmitted from an encoder section for ultimate decoding in a decoder section, and a delta modulation mode wherein signals indicative of an increase, a decrease or no change are transmitted in lieu of digital data words, comprising:

first means responsive to incoming digital data words to detect strings of data words having a low spatial frequency of change and for establishing operation in the delta modulation mode in response thereto;

a delta modulation loop including an adder, a register means the output of which is connected to one input of said adder, and switching means for alternatively connecting the input of said register means to the output of said adder in response to operation in the delta modulation, or to a source of a base word including at least a high order portion of an input data word in response to operation in the coarse mode;

second means for comparing the output of said adder with an incoming data word and for generating delta modulation control signals indicative of an increase, a decrease or no change required to tend to bring the output of the adder into aggreement with the incoming data words, and applying said delta modulation control signals to said adder, said controls signals comprising fewer digital bits than said incoming digital data words;

third means for comparing the output of said adder with input data words and for shifting the mode of operation from the delta modulation mode into the coarse mode in response to a given disparity therebetween, said third means including means for forcing said second means to establish an output therefrom which generates code signals indicative of transfer from the delta modulation mode into the coarse mode;

encoder section output means responsive to said second means and to at least high order portions of incoming digital data words for transmitting said delta modulation control signals in response to operation in the delta modulation mode, for transmitting said high order fraction of input data words in response to operation in said coarse mode and for transmitting, in response to transfer from said coarse mode into said delta modulation mode, a sequence of data words indicating said transfer; and a decoder section responsive to signals transmitted by said encoder output means for generating digital data words having a greater number of digital bits than said delta modulation control signals.

2. A data compression system according to claim 1 wherein said high order fraction of said input data words comprises the same number of digital bits as said delta modulation control signals.

3. A data compression system according to claim 1 wherein said second means comprises a comparison circuit for providing a first output signal in response to the value in said register means being equal to or less than the value of said input word, a second output signal in response to the value in said register means being equal to or greater than the value of said input word, and means responsive to said third means for forcing said comparison circuit to provide both of said output signals, said delta modulation control signals comprising said first output and the complement of said second output.

4. A data compression system according to claim 1 wherein said decoder section includes a second delta modulation loop having a second adder, a second register means, the output of which is connected to one input of said second adder, and switching means for alternatively connecting the input of said second register means to the output of said second adder in response to operation in the delta modulation mode, or to at least said signals transmitted by said encoder output means in response to operation in the coarse mode.

5. A data compression system according to claim 4 wherein said switching means and said second switching means each provide to the input of the respective register, in addition to the high order portion of an input data word and the signals transmitted by said encoder output means, respectively, signals equivalent to a value which is between the maximum and minimum values which can be represented by said high order portion of said transmitted signals, respectively.

6. A data compression system according to claim 1 wherein said encoder section output means includes means for generating a sequence of control signals in response to transfer from said coarse mode into said delta modulation mode, said sequence of control signals advancing from a coded indication of the delta modulation mode, through successive other coded indications, and thence to a coded indication of the coarse mode, and includes switching means controlling the output of said encoder section output means in response to said coded indications.

7. A data compression system according to claim 6 wherein said sequence of control signals comprise a sequence of binary encoded bits and wherein said switching means comprises a multiplexer circuit responsive to said binary encoded bits to connect a pair of signal outputs thereof to a selected one of a plurality of signal input pairs in dependence upon said binary encoded bits applied thereto.

* * * * *

UNITED STATES PATENT OFFICE

CERTIFICATE OF CORRECTION

Patent No. 3,784,737 Dated January 8, 1974

Inventor(s) Glenn C. Waehner

It is certified that error appears in the above-identified patent and that said Letters Patent are hereby corrected as shown below:

Column 4, line 19, after "signal" insert -- to the --

Column 6, line 30, change "signal" to -- signals --

Column 6, line 52, after "exactly" insert -- following --

Column 7, line 23, change "knwon" to -- known --

Column 7, line 36, after "circuit" insert -- 120 --

Column 7, line 67, change "the" to -- The --

Column 8, line 42, change "0" to -- "0" --

Column 10, line 35, change "914" to -- 194 --

Column 12, line 14, change "aggreement" to -- agreement --

Signed and sealed this 6th day of August 1974.

(SEAL)
Attest:

McCOY M. GIBSON, JR.
Attesting Officer

C. MARSHALL DANN
Commissioner of Patents